United States Patent [19]

Shepard et al.

[11] Patent Number: 5,206,492

[45] Date of Patent: Apr. 27, 1993

[54] BAR CODE SYMBOL SCANNER WITH REDUCED POWER USAGE TO EFFECT READING

[75] Inventors: Howard M. Shepard, Great River; Boris Metlitsky, Stony Brook; Mark Krichever, Hauppauge, all of N.Y.

[73] Assignee: Symbol Technologies, Inc., Bohemia, N.Y.

[21] Appl. No.: 740,244

[22] Filed: Aug. 5, 1991

Related U.S. Application Data

[62] Division of Ser. No. 428,770, Oct. 30, 1989, Pat. No. 5,099,110.

[51] Int. Cl.⁵ .......................... G06K 7/01; G06K 7/10
[52] U.S. Cl. .................................. 235/472; 235/470; 235/467
[58] Field of Search ............... 235/462, 472, 470, 467; 250/235; 359/214, 223, 224

[56] References Cited

U.S. PATENT DOCUMENTS

| | | | |
|---|---|---|---|
| 3,532,408 | 10/1970 | Dostal | 359/214 |
| 3,636,317 | 1/1972 | Torrey | 235/472 |
| 3,699,312 | 10/1972 | Jones et al. | 235/472 |
| 3,925,639 | 12/1975 | Hester | 235/462 |
| 3,999,833 | 12/1976 | Reich et al. | 359/224 |
| 4,387,297 | 6/1983 | Swartz et al. | 235/462 |
| 4,502,752 | 3/1985 | Montagu | 359/214 |
| 4,578,571 | 3/1986 | Williams | 235/472 |
| 4,732,440 | 3/1988 | Gadhok | 359/223 |
| 4,902,083 | 2/1990 | Wells | 359/214 |
| 4,930,848 | 6/1990 | Knowles | 235/467 |
| 5,015,831 | 5/1991 | Eastman et al. | 235/462 |

FOREIGN PATENT DOCUMENTS

| | | | |
|---|---|---|---|
| 2-232789 | 9/1990 | Japan | 235/472 |
| 2-232790 | 9/1990 | Japan | 235/472 |
| 2175705A | 12/1986 | United Kingdom . | |

OTHER PUBLICATIONS

IBM Technical Disclosure Bulletin, W. L. Grabowski- and R. J. Wohl, vol. 5, No. 5, Oct. 1962-p. 78.

Primary Examiner—Robert Weinhardt

[57] ABSTRACT

Electrical power consumption is saved in a low-cost scanner for reading bar code symbols by oscillating one of the scanner components either by mechanical power alone or by a low-power electrical drive.

33 Claims, 7 Drawing Sheets

FIG. 4
FIG. 5
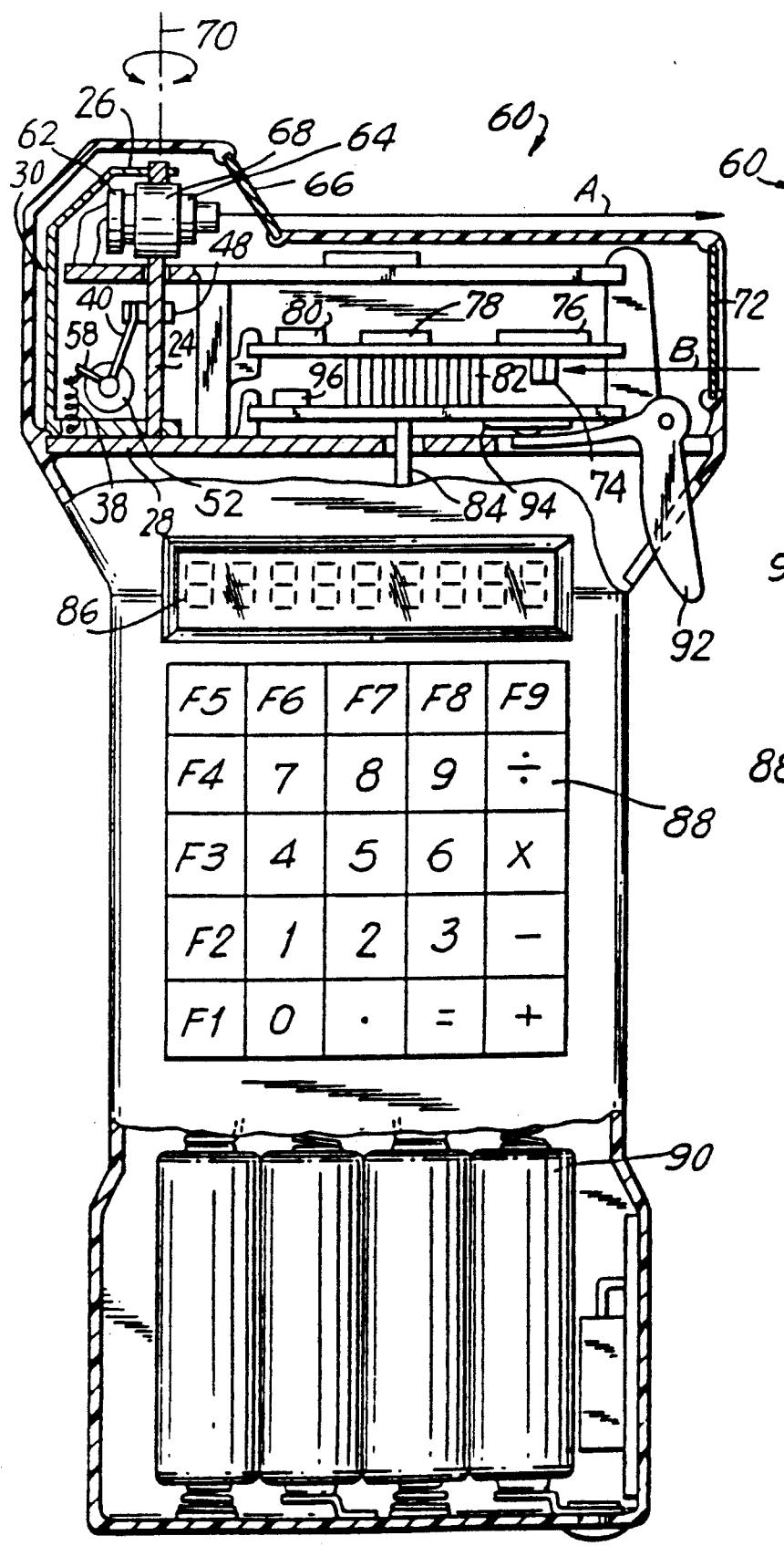
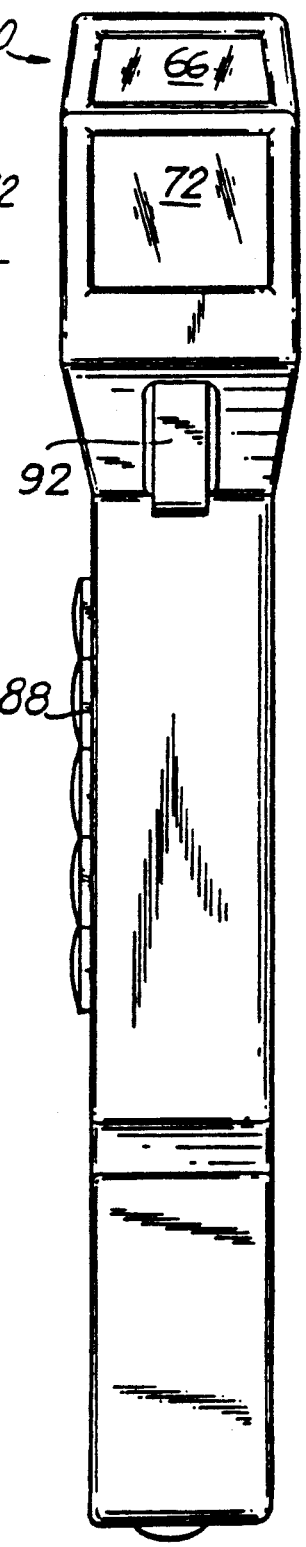

BAR CODE SYMBOL SCANNER WITH REDUCED POWER USAGE TO EFFECT READING

This is a division of application Ser. No. 428,770, filed Oct. 30, 1989, now U.S. Pat. No. 5,099,110.

BACKGROUND OF THE INVENTION

1. Field of the Invention

This invention generally relates to a scanning arrangement in a scanner operative for repetitively scanning indicia having parts of different light reflectivity, for example, bar code symbols, and, more particularly, to operating such a scanning arrangement under low electrical power or mechanical power conditions to minimize usage of electrical power.

2. Description of Related Art

Various optical readers and optical scanners have been developed heretofore to optically read bar code symbols applied to objects in order to identify the object by optically reading the symbol thereon. The bar code symbol itself is a coded pattern comprised of a series of bars of various widths and spaced apart from one another to bound spaces of various widths, the bars and spaces having different light reflecting properties. The readers and scanners electro-optically decoded the coded patterns to multiple digit representations descriptive of the objects. Scanners of this general type have been disclosed, for example, in U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717; 4,760,248; 4,806,742; 4,808,804; 4,825,057; 4,816,661; 4,816,660; 4,835,374; 4,845,350; 4,871,904; 4,896,026; D-306,434; and D-306,435, as well as pending U.S. patent applications Ser. Nos. 193,265 now U.S. Pat. No. 5,124,540, now abandoned; 265,149 now abandoned; 264,693; 367,335 now U.S. Pat. No. 5,124,539 and 392,207 now abandoned, all of said patents and patent applications having been assigned to the same assignee as the instant invention and being hereby incorporated herein by reference.

As disclosed in the above-identified patents and applications, a particularly advantageous embodiment of such a scanner resided, inter alia, in emitting a light beam, preferably a laser beam, emitted from a light source, preferably a gas laser or a laser diode, and in directing the laser beam to a symbol to be read. En route to the symbol, the laser beam was directed to, and reflected off, a light reflector of a scanning component. The scanning component moved the reflector in a cyclical fashion and caused the laser beam to repetitively scan the symbol. The symbol reflected the laser bear incident thereon. A portion of the incident light reflected off the symbol was collected and detected by a detector component, e.g. a photodiode, of the scanner. The photodiode had a field of view, and the detected light over the field of view was decoded by electrical decode circuitry into data descriptive of the symbol for subsequent processing. The cyclically movable reflector swept the laser beam across the symbol and/or swept the field of view during scanning.

There were several different types of scanning components disclosed in the above patents and applications. For example, U.S. Pat. No. 4,251,798 disclosed a polygonally-shaped multi-faced wheel having mirrored outer surfaces on each of its faces. The wheel was mounted for rotation so that each mirrored outer surface was, in turn, positioned in an optical path along which the incident laser beam was directed to the symbol to be scanned. An electrical motor continuously rotated the mirrored wheel at a uniform angular rate during scanning.

Other scanning components disclosed in U.S. Pat. No. 4,251,798 were a bimorph or ferroelectric-type oscillating element, as well as a speaker-type oscillating element, each element having an oscillatable mirror. In each case, electrical power was continuously applied to each scanning element in order to reciprocatingly oscillate the mirror.

U.S. Pat. Nos. 4,387,297 and 4,496,831 disclosed a high-speed scanning component including an electric motor operative for reciprocatingly oscillating a reflector in opposite circumferential directions relative to an output shaft of the motor. Here, again, electrical power was continuously applied to the motor during scanning U.S. Pat. No. 4,387,297 also disclosed a penta-bimorph scanner which also required continuous electrical power during scanning.

The light reflector need not have been a single planar mirror, but, as described in U.S. Pat. No. 4,760,248, could have been an optical component having a construction which was part concave and part planar. The reflector could be driven by an electrical motor in alternate circumferential directions along arc lengths less than 360° as described in U.S. Pat. No. 4,496,831, or, in a variant construction, could be rotated completely around an axis as described in U.S. Pat. No. 4,816,661.

In still another variant construction, as described in U.S. Ser. No. 193,265 filed May 11, 1988, rather than using a reflector to effect the scanning action, the reflector was eliminated altogether in a so-called "mirrorless" design in which one or more of the other scanner components were jointly or separately moved relative to one another to effect a reciprocating scanning action driven by an electrical motor. The other scanner components included a light source component, e.g. a laser diode, and/or optical components, e.g. a focusing lens, and/or the photodetector component, e.g. a photodiode.

In all of the above-described scanners, no matter whether a reflect or scanner was oscillated in alternate circumferential directions or completely around an axis of rotation, and no matter what the configuration of the resulting scan pattern on the symbol, e.g. a single scan line, a set of multiple parallel or intersecting scan lines, an X-shaped pattern, a Lissajous pattern, a curvilinear pattern (see U.S. Ser. No. 138,563 filed Dec. 28, 1987), etc., the scanning component was energized and driven by electrical power which was continuously applied during scanning. This represented a large electrical current drain, particularly when an electrical motor was employed as a prime mover since the motor drew the most electrical current of all the electrical components in the scanner. In scanners of the hand-held type, wherein substantially all of the scanner components, including a set of batteries, were mounted on-board a hand-held head, the high current drain reduced the working lifetime of the on-board batteries.

To round out this discussion, electro-optical wand- or pen-type readers have also been used to scan bar code symbols. These readers were manually positioned on, and dragged across, the symbol. These readers had no on-board scanning components. Scanning was effected by the user by the manual act of dragging a reader tip across, and in contact with, the symbol. In addition, non-contact hand-held heads have been proposed for reading symbols. Such non-contact heads were held at a distance from the symbol. However, scanning was effected not by any on-board scanning component, but by flicking one's wrist in a direction across the symbol.

SUMMARY OF THE INVENTION

1. Objects of the Invention

It is a general object of this invention to advance the state of the art of scanners for reading indicia of different light reflectivity, particularly laser scanners for reading bar code symbols.

It is another object of this invention to minimize electrical power consumption of such scanners during scanning.

Another object of this- invention is to increase the working lifetime of batteries on-board a hand-held head of such scanners.

A further object of this invention is to provide a low-cost, low-power, power-saving arrangement for, and method of, scanning bar code symbols.

2. Features of the Invention

In keeping with these objects, and others which will become apparent hereinafter, one feature of this invention resides, briefly stated, in an arrangement for, and a method of, scanning indicia having parts of different light reflectivity by directing light toward the indicia and by collecting reflected light returning from the indicia. This invention comprises a scanner component supported by holder means for oscillating movement about an axis in alternate circumferential directions thereof between scan end positions. The holder means are operative for constantly returning the component to a rest position between the scan end positions.

According to this invention, read-start means are provided for moving the component in one of the circumferential directions away from the rest position to one of the scan end positions angularly spaced from the rest position. The read-start means are also operative for enabling the holder means to urge the component in the other of the circumferential directions past the rest position to another of the scan end positions angularly spaced from the rest position. The component is oscillated in a damped manner before coming to a halt in the rest position.

Advantageously, the holder means is an elongated spring extending along the axis and having opposite ends stationarily secured to a support. The component is mounted on the spring between the ends thereof. In a preferred embodiment, the spring is a torsion wire twistable about the axis. The torsion wire is tensioned and stores energy during movement to said one scan end position, and the wire releases at least part of its stored energy during movement to said other scan end position.

The read-start means includes a drive and a transmission driven by the same. The transmission pushes the component to said one scan end position, and is disengaged from the component after the component has reached said one scan end position.

In one construction, the transmission includes a cam fixedly mounted on the spring, and an actuator wire having one end connected to the drive, and an opposite drive end engaging the cam during pushing of the component. The cam is radially outwardly tapered, and terminates in a tip. The drive end of the actuator wire is positioned past the tip and out of engagement with the cam when the component is situated at said one scan end position.

The drive advantageously includes a manually-operated trigger actuatable by a user in a hand-held embodiment of the scanner from an off state to an on state. An automatic return spring constantly urges the trigger to the off state.

In another construction, the drive includes an electrically-operated actuator, e.g. a solenoid, operative, in response to an energizing pulse of short-lived duration, for moving a core, either through an arcuate distance of limited extent, or back and forth over a linear path.

The scanner component may be a light reflector, e.g. a mirror, or any one of the other scanner components, e.g. a laser light source such as a laser diode and/or an optical component, e.g. a focusing lens, and/or a photodetector, e.g. a photodiode.

In another embodiment, the holder means is a tuning fork. A permanent magnet is fixedly mounted on one arm of the fork and the scanner component is fixedly mounted on the other arm. One or more energizing pulses are supplied to an electro-magnetic coil for displacing the magnet and, in turn, for oscillating the scanner component in a scan which extends in one direction over the indicia. The stem of the fork may also be oscillated to scan the indicia in another direction generally perpendicular to said one direction to effect two-axis scanning.

The holder means could also be a flexible beam, e.g. a planar leaf spring from which the scanner component and the permanent magnet are suspended from a bent central portion of the spring. The opposite spring ends are anchored. By momentarily and periodically energizing a nearby coil, the magnet and, in turn, the scanner component are oscillated, preferably at the resonant frequency of the component/magnet assembly.

Thus, in accordance with this invention, the scanner component is oscillated by either using mechanical power alone or by temporarily energizing an electrical component. In either case, electrical power consumption expended during scanning is minimized. The working lifetime of on-board batteries is dramatically increased. Power is saved without compromising the ability of the scanner to read indicia.

Yet another feature of this invention relates to employing the above-described scanning arrangement in a low-cost scanner for reading indicia. The scanner comprises means for emitting and directing a light beam along a transmission path toward indicia located exteriorly of the scanner, thereby reflecting light of variable intensity from the indicia, as well as sensor means having a field of view, and operative for detecting at least a portion of the reflected light and thereby generating an electrical signal indicative of the detected light.

The scanner further comprises scanning means for scanning at least one of said light beam and said field of view along a scan direction. Such scanning means includes a light reflector movable in a cyclical manner along the scan direction. The reflector has a width, as considered along the scan direction, which is smaller than its height, as considered along a non-scan direction which is transverse to the scan direction.

The just-described tall and narrow reflector is advantageously used as a light collector in the return path of the reflected light. The narrow width of the reflector increases the depth of focus of the scanner and also minimizes spherical and chromatic aberrations. The tall height of the collector increases the amount of light actually collected from the indicia, thereby providing an electrical signal of large magnitude to be digitized and decoded.

In a particularly advantageous low-cost construction, the tall and narrow light reflector is mounted on the aforementioned biasing means, and is oscillated in a damped manner by the above-described cooperation between the holder means and the aforementioned read-start means.

The novel features which are considered as characteristic of the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

FIG. 4 is a partly broken-away, partly sectioned view of a field-portable scanner employing still another embodiment according to this invention;

FIG. 5 is a side view of FIG. 4;

DETAILED DESCRIPTION OF THE PREFERRED EMBODIMENTS

Figure 1:
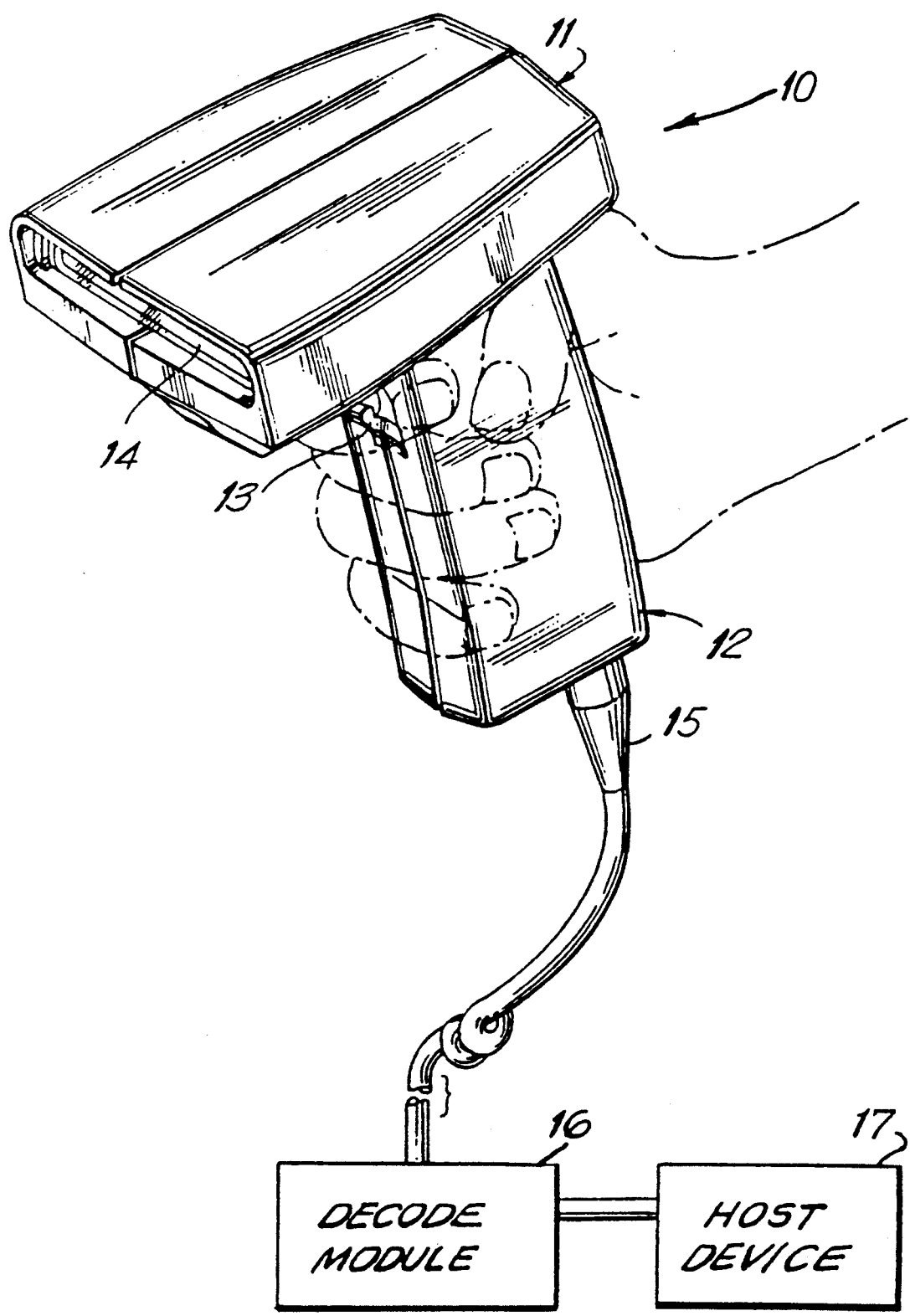
FIG. 1 is a front perspective view of a hand-held head employed in a scanner.

Referring now to the drawings, reference numeral 10 generally identifies a hand-held, gun-shaped scanner head having a barrel 11 and a handle 12. A manually-operable trigger 13 is situated below the barrel 11 on an upper, forwardly-facing part of the handle 12. As known from the above-identified patents and applications incorporated by reference herein, a light source component, typically, but not necessarily, a laser, is mounted inside the head 10. The light source emits a light beam along a transmission path which extends outwardly through a window 14 that faces indicia, e.g. bar code symbols, to be read. Also mounted within the head is a photodetector component, e.g. a photodiode, having a field of view, and operative for collecting reflected light returning through the window 14 along a return path from the symbol.

A scanner component is mounted within the head 10, and is operative for scanning the symbol and/or the field of view of the photodetector. The scanner component typically, but not necessarily, includes at least one light reflector positioned in the transmission path and/or the return path. The reflector is driven by an electrically-operated drive, either in alternate circumferential directions, or rotated completely around an axis of rotation.

The photodetector generates an electrical analog signal indicative of the variable intensity of the reflected light. This analog signal is converted into a digital signal by an analog-to-digital converter circuit. This digital signal is conducted, according to one embodiment, along an electrical cable 15 to a decode module 16 located exteriorly of the head 10. The decode module 16 decodes the digital signal into data descriptive of the symbol. An external host device 17, usually a computer, serves mainly as a data store in which the data generated by the decode module 16 is stored for subsequent processing.

In use, each time a user wishes to have a symbol read, the user aims the head at the symbol and pulls the trigger 13 to initiate reading of the symbol. The symbol is repetitively scanned a plurality of times per second, e.g. 40 times per second. As soon as the symbol has been successfully decoded and read, the scanning action is automatically terminated, thereby enabling the scanner to be directed to the next symbol to be read in its respective turn.

Figure 2:
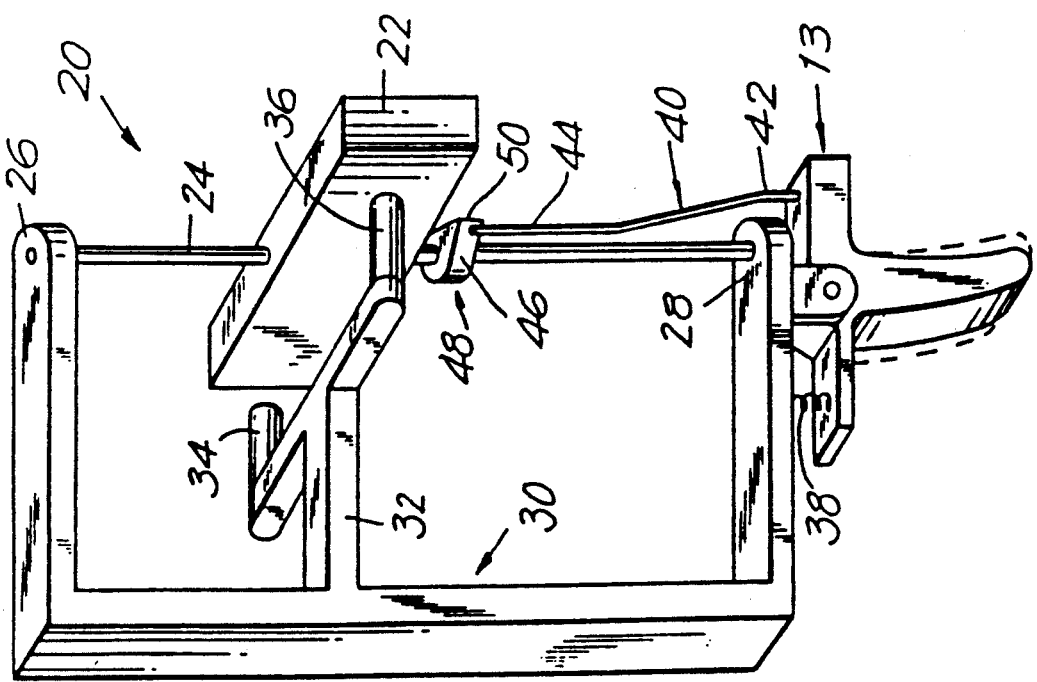
FIG. 2 is an enlarged front perspective view of a scanning arrangement for use in the head of FIG. 1 according to one embodiment of this invention.

Turning now to FIG. 2, the trigger 13 is shown again, but this time in connection with a power-saving scanning arrangement 20 according to one embodiment of this invention. The arrangement 20 includes a light reflector 22, preferably a planar mirror, fixedly mounted on an elongated torsion wire 24 extending along an axis of rotation. The wire 24 has opposite ends stationarily secured to spaced-apart arms 26, 28 of a generally E-shaped support frame 30. The frame 30 has a middle arm 32 on which a pair of stops 34, 36 are transversely spaced apart of each other on opposite sides of the torsion wire 24.

The trigger 13 is pivotably mounted on the lower arm 28. An automatic return spring 38 is mounted between the lower arm 28 and the trigger 13, and is operative to constantly urge the trigger to the off state illustrated in solid lines. An actuator rod 40 has one end 42 connected to a forward projection of the trigger for joint displacement therewith, and an opposite driving end 44 which, in the off state of the trigger, engages a tapered cam surface 46 of a cam 48 that is fixedly mounted on the torsion wire 24. The cam 48 has a circular portion and an integral, generally triangular, portion which terminates radially in a tip 50. The cam 48 could also be mounted on the reflector 22.

As illustrated in FIG. 2, the trigger is in an off state, and the reflector 22 is positioned in a so-called rest position in which the reflector 22 is situated in the aforementioned transmission path of the light beam and/or the return path of the reflected light. The reflector 22 is spaced away from either stop 34 or 36. In order to initiate scanning, i.e. reading of the symbol, the user displaces or pulls the trigger 13 to the on state illustrated in phantom lines in FIG. 2 against the restoring action of the automatic return spring 38. The actuator rod 40 participates in this movement and, in turn, the driving end 44 firmly bears against and follows the cam surface 46 in a radially outward direction toward the tip 50. The cap 48 and the reflector 22 are jointly moved in one circumferential direction away from the rest position, thereby twisting the torsion wire 24 about its longitudinal axis.

This movement and twisting continue until the reflector 22 strikes the stop 34, thereby preventing further movement of the reflector past the stop 34. The stop 34 defines a scan end position, also known as a launch position. For safety's sake, the stop 34, just like the stop 36, is advantageously constituted of a resilient material, e.g. foam rubber, to prevent shattering of the reflector 22.

At this time, the drive end 44 slides past the cam tip 50, thereby suddenly and abruptly releasing the energy stored in the twisted torsion wire 24. Starting from the launch position, the now-released reflector 22 is thus free to oscillate about said axis. Initially, the reflector 22 moves under the influence of the untwisting torsion wire 24 in the opposite circumferential direction past the rest position to another scan end position. Preferably, the reflector 22 travels all the way to the other stop 36. Thereupon, the reflector 22 oscillates back and forth about the longitudinal axis of the torsion wire 24 and, in fact, resonates at a frequency of oscillation determined, inter alia, by the mass of the reflector 22 and the spring constant of the wire 24. The reflector 22 continues its oscillations in a damped manner, with the amplitude or angular distance of travel of successive oscillations being progressively less than that of the previous oscillation. Eventually, after a time period on the order of one second, and after a plurality of such damped oscillations have occurred, the reflector 22 is returned by the torsion wire 24 to the rest position at which the reflector 22 has come to a halt.

Upon release of the trigger, the automatic return spring 38 returns the trigger to the off state. At the same time, the actuator wire 40 is re-set to its initial position in which it, once again, bears against the cam 48.

As described in connection with the embodiment of FIG. 2, the reflector 22 is repetitively oscillated without the expenditure of any electrical power. No electrical motors or electrically-driven elements are used only mechanical power is used. The mechanical drive is derived from the user. This greatly reduces the amount of electrical energy consumed in the head of the scanner. In the case where an on-board battery pack is used to electrically power the head, the working lifetime of such batteries is greatly increased due to the reduced electrical energy needs of the scanner component which heretofore was the major consumer of electrical energy.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Figure 3:
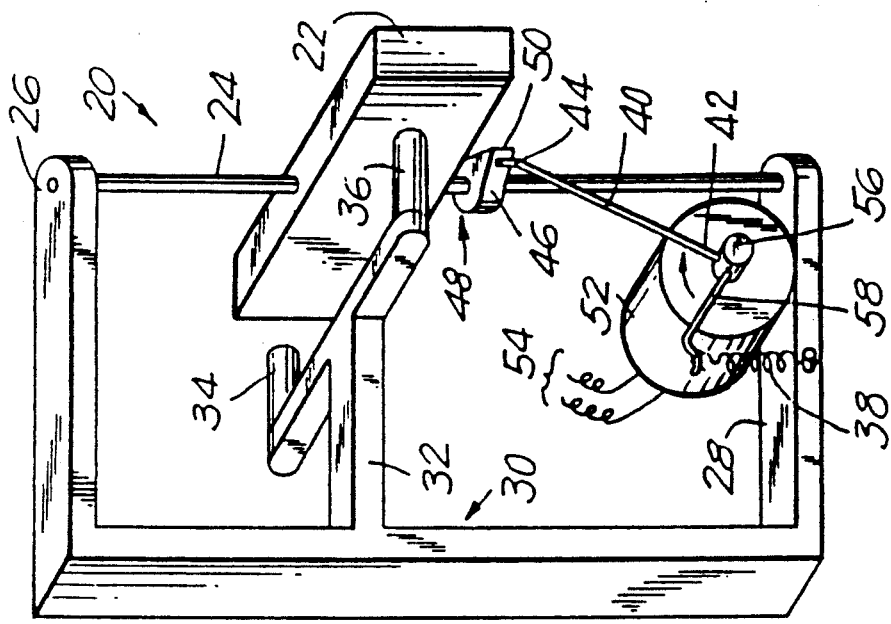
FIG. 3 is a view analogous to FIG. 2, but of another embodiment of this invention.

Rather than relying solely on mechanical power, the embodiment of FIG. 3 is identical to that of FIG. 2, except for the use of a low-power electrical drive for moving the reflector 22. A rotary solenoid 52 is mounted on the lower arm 28 of the frame 30, and is electrically energized by a pulse-type signal of short-lived duration. The energizing pulse is conducted along electrical wires 54 to enable the solenoid 52 to turn a core shaft 56 through a limited angular distance. The end 42 of the actuator rod 40 is connected to the core shaft 56.

When the solenoid is energized, the core shaft 56 is turned and, in response, the driving end 44 firmly bears against and pushes the tapered cam 48 and the reflector 22 to the launch position. When the driving end 44 is moved past the tip 50, the reflector 22 is free to oscillate as described above. Energization of the solenoid 52 is stopped before the oscillating reflector is returned to the rest position. At that time, the automatic return spring 38, which is coupled to the core shaft 56 by a holding rod 58, acts to return the core shaft 56 to its initial position in which the actuating rod 40 engages the cam 48.

The electrical power required to move and hold the core shaft 56 to and in the launch position is much less than that required in prior art embodiments to affirmatively oscillate or rotate a reflector. The energy stored in the twisted torsion wire is primarily responsible for maintaining the oscillations of the reflector.

Turning now to FIGS. 4 and 5, a hand-held scanner 60 is illustrated wherein, rather than oscillating a light reflector with the scanning arrangement of FIG. 3, the reflector is eliminated and other scanner components are oscillated. More specifically, the scanner 60 includes a light source 62, preferably a laser diode, mounted at one end of an optics tube 64 in which an optical assembly is situated. The diode emits a laser beam. The optical assembly directs the laser beam through a window 66 along the direction of arrow A, and also focuses the laser beam to a certain spot size exteriorly of the scanner 60 at a certain range of working distances relative thereto. Typically, the optical assembly includes a focusing lens and an aperture stop (see U.S. Ser. No. 193,265 filed May 11, 1988).

The diode and the optical assembly are together mounted in a holder 68 which, in turn, is mounted on the aforementioned torsion wire 24 for oscillating movement about an axis 70. The solenoid drive 52 and its operation are identical to that described above in connection with FIG. 3, the only differences being that the support 30 has a bent upright to conform to the dimensions of the housing of the scanner 60 and, more importantly, that the reflector 22 has been eliminated and replaced by the combination of the diode and the optical assembly. FIG. 4 is not drawn to scale; preferably, the holder 68 is centrally located between the ends of wire 24.

The light reflected off a symbol is returned to the scanner through a second window 72 to a photodetector 74 operative for converting the variable intensity of the detected reflected light to an analog signal. An analog-to-digital circuit 76 converts the analog signal to a digital signal which is then decoded by an on-board decode circuit 78. An on-board microprocessor 80 sends the decoded signal via a connector 82 and electrical wires 84 either to a display 86 and/or to an on-board memory. A keyboard 88 is mounted on the scanner to manipulate the decoded data or to enter information relating to the symbol being read. An on-board battery pack 90 is employed to power all of the electrical components in the scanner. Preferably, the pack 90 contains rechargeable batteries.

A manually-operated trigger 92 is depressed to initiate symbol reading. The depression of the trigger causes a trigger switch 94 to be actuated, thereby advising the microprocessor 80 that scanning is to commence. The microprocessor, among other things, advises a control circuit 96 to generate the energizing signal for energizing the solenoid 52 via electrical wires 54, thereby initiating the oscillating process described above, except, this time, rather than oscillating the reflector, both the laser diode and the optical assembly are oscillated as a unit by the twisting and untwisting of the torsion wire 24.

Figure 6:
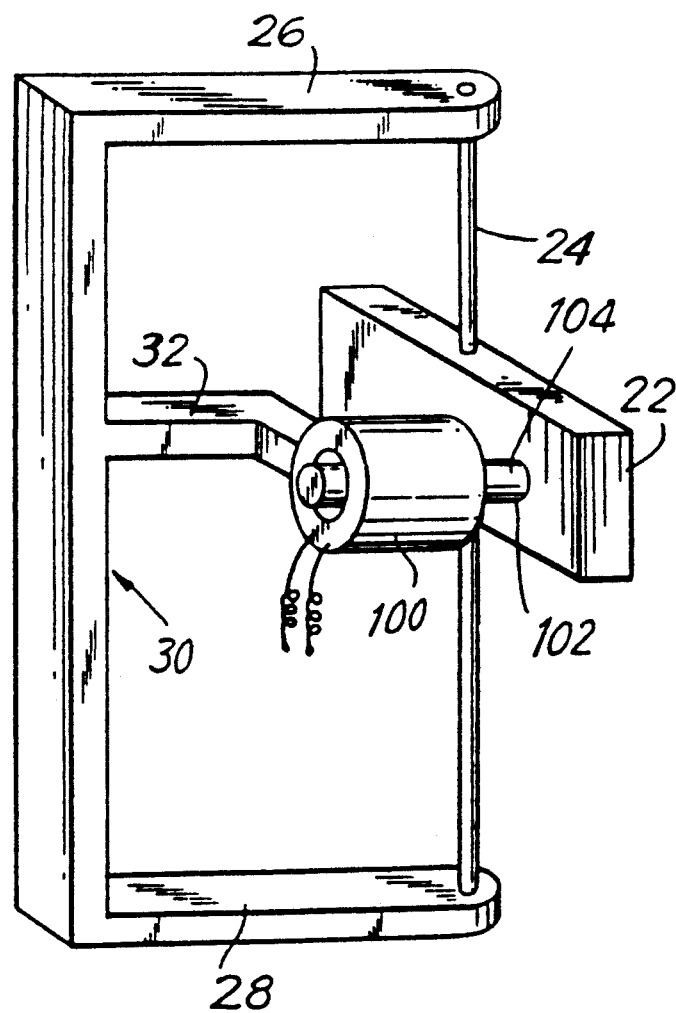
FIG. 6 is a view analogous to FIG. 2, but of yet another embodiment of this invention.

In still another embodiment, as shown in FIG. 6, a solenoid coil 100 having a core plunger 102 mounted for reciprocating movement is mounted on the center arm 32 of the support 30. One end 104 of the plunger 102 is connected to the back of the reflector 22. When energized, the solenoid 100 pulls the plunger more deeply into its interior, thereby displacing the reflector 22 in one circumferential direction and, at the same time, tensioning the torsion wire 24. When the solenoid coil 100 is not energized, the plunger and the reflector are free to oscillate as described above. The FIG. 6 embodiment is particularly efficient in terms of electrical energy usage, since it only requires a single pulse to energize the solenoid coil 100 prior to being de-energized.

Figure 11:
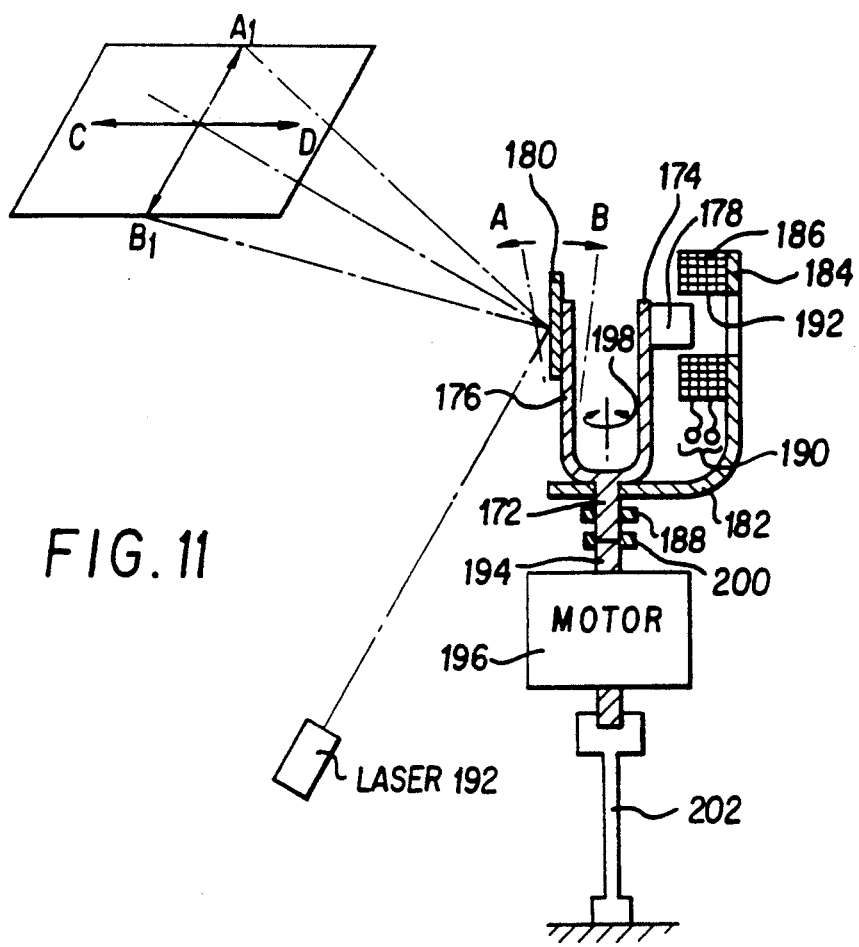
FIG. 11 is a side view of another embodiment of a scanning arrangement according to this invention.
Figure 10:
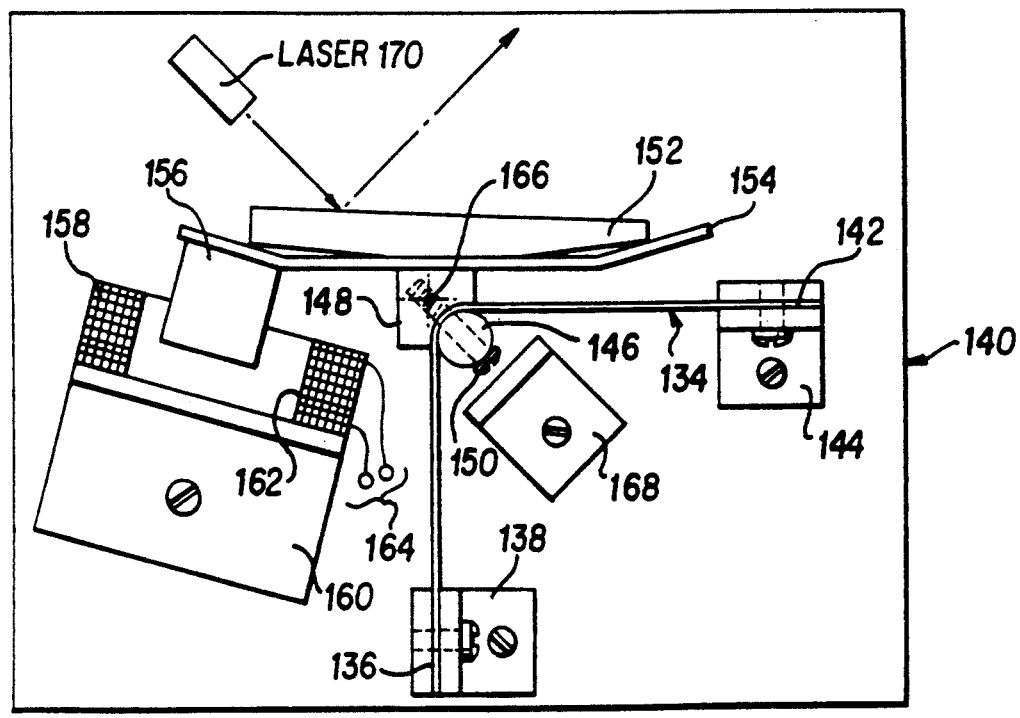
FIG. 10 is a top plan view of a further embodiment of a scanning arrangement according to this invention.

In other variants, rather than using a torsion wire, a coiled wire, a flat bar or a Bendix flex-pivot-type spring may be employed (see discussion of FIGS. 10 and 11).

Figure 7:
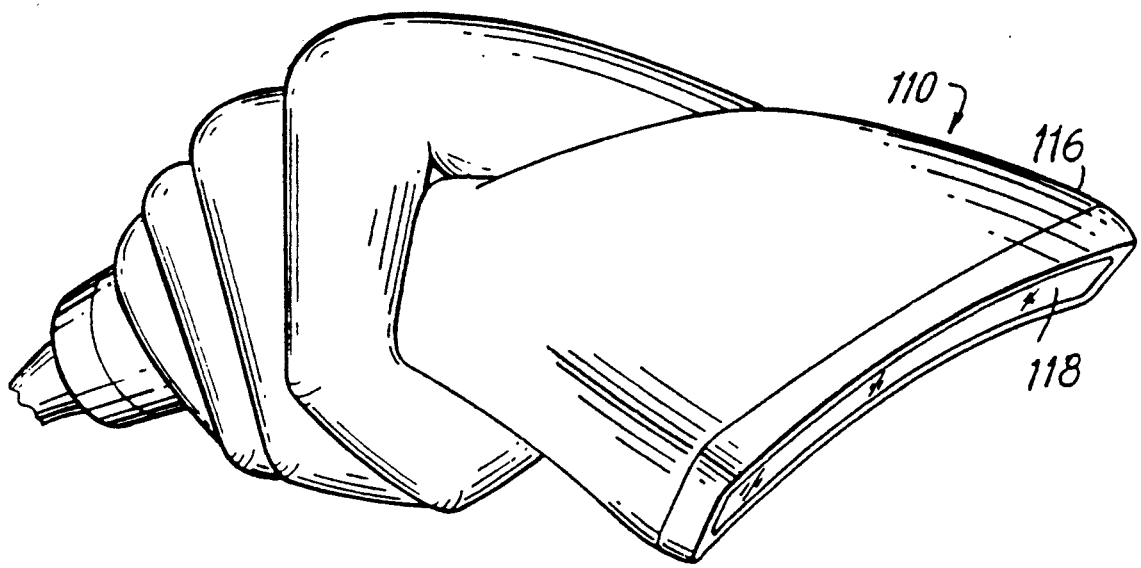
FIG. 7 is a front perspective view of a hand-held contact-type scanner.
Figure 8:
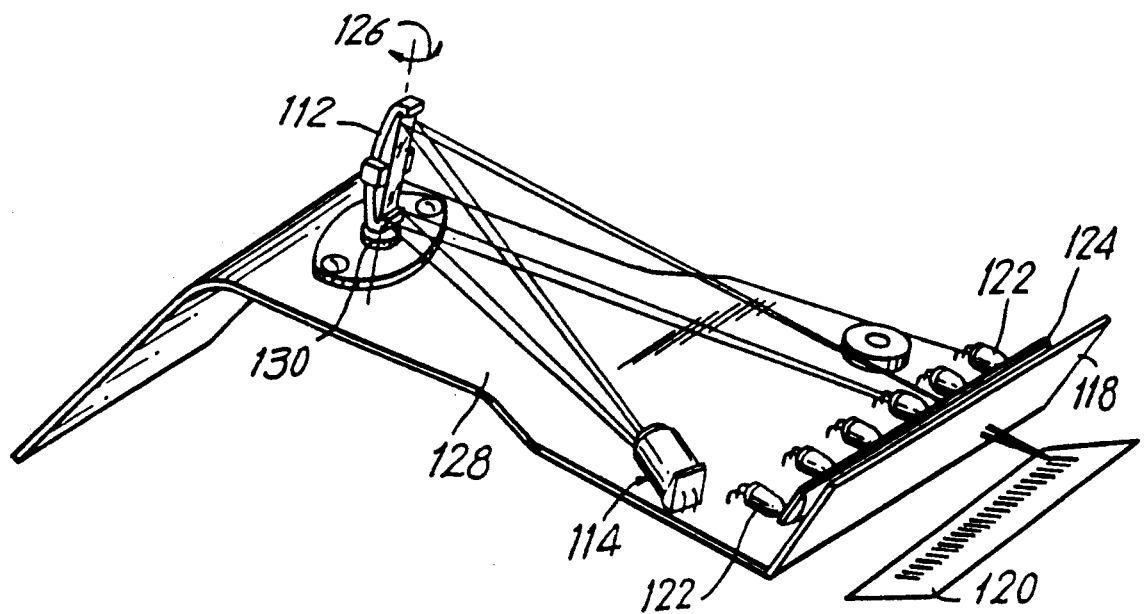
FIG. 8 is a front perspective view of yet another embodiment of a scanning arrangement according to this invention for use with the FIG. 7 scanner.

Turning now to the embodiment of FIGS. 7 and 8, a low-cost, hand-held scanner 110, preferably of the contact type, is illustrated in which a collecting mirror 112 positioned in the return path is oscillated over a field of view of a photodetector 114. The scanner 110, as shown in FIG. 7, has a streamlined housing 116 configured to easily fit in one's hand. The housing has a front end at which a window 118 is situated. In use, the window 118 is placed in contact, or at least in close proximity with, a symbol 120 to be read. The symbol is shown well away from the window 118 in FIG. 8 solely for purposes of clarity.

An array of light emitting diodes (LED's) 122, preferably arranged in a linear row, is situated within the housing 116 behind the window 118. A cylindrical lens 124 is situated between the LED array and the window, and is operative for rendering the illumination produced by the LED's more uniform over the symbol.

Situated toward the rear of the housing 116 is the collecting mirror 112 which has a rectangular front face which, for the reasons described below, is taller than it is wide. In a preferred embodiment, the width of the front face, as considered along a scan direction extending across the length of the symbol, measures about 3 mm, whereas the height of the front face, as considered along the non-scan direction perpendicular to the scan direction along the height of the symbol, measures from about 15 mm to about 20 mm. The collecting mirror 112 is oscillated about axis 126 to reflect light reflected off the symbol to the photodetector 114. A generally rectangular aperture 132 is situated in front of the photodetector, the dimensions of the aperture, like the mirror, being tall and narrow. All of the components are mounted on a printed circuit board or analogous support 128 which is placed within the housing 116.

Since non-coherent light is generated by the LED's, rather than coherent light generated by laser sources, the non-coherent light is characterized by a poor depth of focus. This is the range between minimum and maximum distances at which the scanner can read the symbol. It is desirable, in most applications, to have a large depth of focus, which is one of the reasons in favor of using lasers as the light source. Since the depth of focus is inversely proportional to the size of the collecting aperture or field of view seen by the photodetector, in order to have a larger depth of focus, the width of the front face of the mirror 112 must be made correspondingly smaller. This is primarily why the front face of the mirror 112 is designed with a narrow width. Another reason is that spherical and chromatic aberrations are minimized by a narrow width collecting mirror.

However, a narrow mirror collects less light reflected from the symbol, thereby providing the scanner with a very low amplitude electrical signal to be digitized and decoded. To increase the amplitude of this signal without increasing the complexity and cost of the electronic processing circuitry, the height of the collecting mirror is increased. This is the primary reason why the front face of the collecting mirror 112 has a tall height.

The collecting mirror 112 may be swept across the symbol by various drives. The mirror 112 could be rotated completely around axis 126 by an electrical motor, although that would be impractical and very wasteful of electrical energy. The mirror 112 could be oscillated in alternate circumferential directions by a scanning element 130 identical to the one disclosed and claimed in U.S. Pat. No. 4,496,831.

Figure 9:
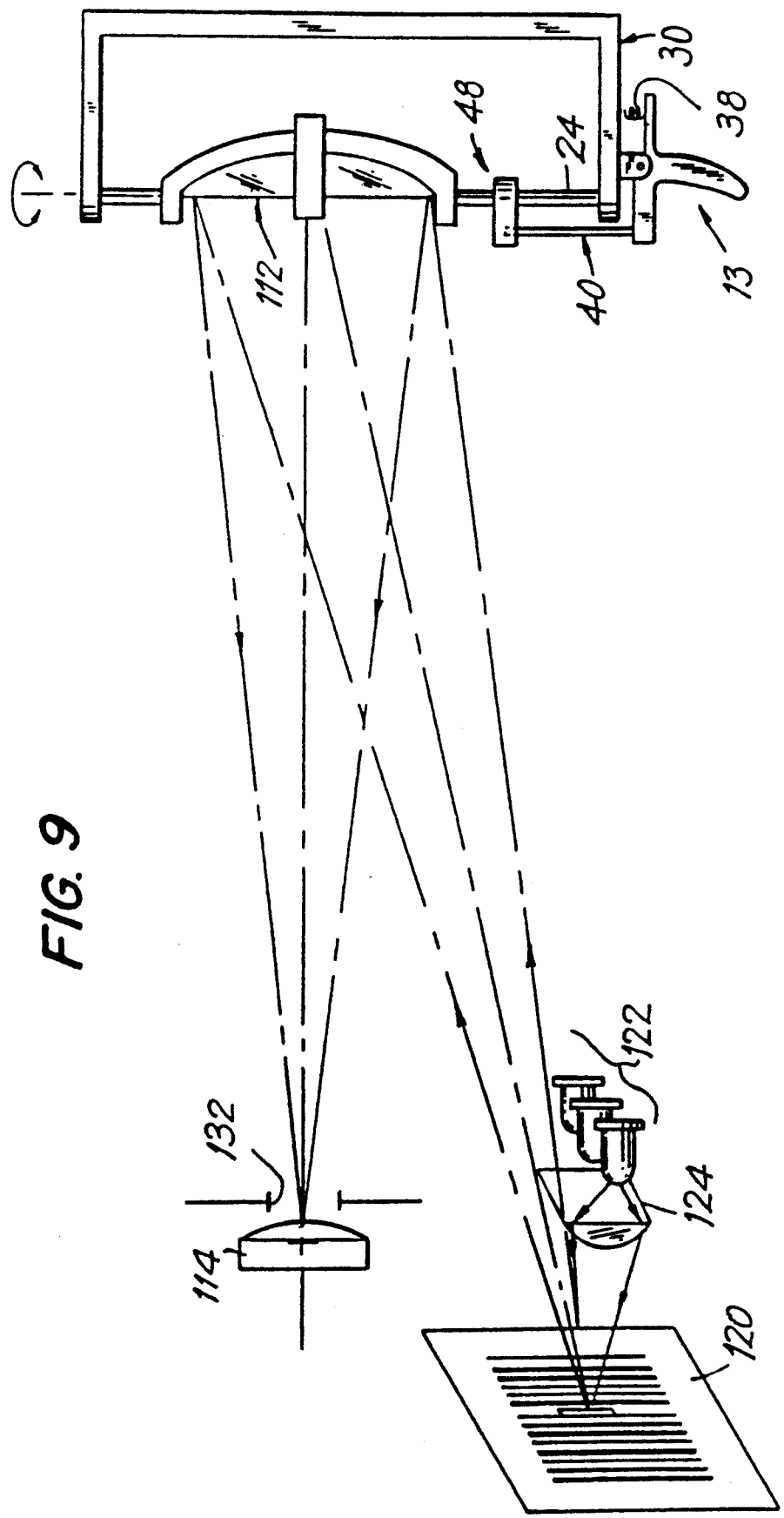
FIG. 9 is a diagrammatic view of an additional embodiment of a scanning arrangement according to this invention.

Alternatively, the collecting mirror 112 could be oscillated by any one of the power-saving scanning arrangements described in FIGS. 2, 3 or 6 herein. Thus, as shown in FIG. 9, the LED array 122 and the cylindrical lens 124 uniformly illuminate the symbol 120. A portion of the light reflected off the symbol is collected by the collecting mirror 112 which is oscillated by the trigger-actuated arrangement previously described above in connection with FIG. 2. The collected light is directed to the aperture 132 prior to being detected by the photodetector 114. The power consumed by the LED's will be determined primarily by the number employed. As a general rule, the LED's consume less power and are less expensive than a laser source.

As previously mentioned, holder means other than a torsion wire can be utilized. Thus, as shown in FIG. 10, a flexible beam, e.g. a generally planar leaf spring 134, is employed in another power-saving scanning arrangement. Leaf spring 134 has one end 136 fixedly mounted to an upright of an L-shaped bracket 138 which is anchored to a base support 140. Spring 134 has an opposite end 142 fixedly mounted to an upright of another L-shaped bracket 144 which is anchored to the base support 140. The uprights are oriented at 90° relative to each other. A central portion of the spring 134 is guided around a cylindrical clamping pin 146. The central portion of the spring 134 is clamped between the clamping pin 146 and a bearing surface of a V-block 148 by means of a set screw 150. The clamping pin 146 imparts a 90° bend to the leaf spring at the central portion.

A scanner component, e.g. a light reflector 152, is fixedly mounted to a rear support 154 which, in turn, is fixedly secured to the V-block. The rear support 154 has a permanent magnet 156 mounted at one of its ends. An electromagnetic coil 158 is mounted adjacent the magnet 156 on an upright of another L-shaped bracket 160 which, in turn, is mounted on the base support 140. The coil 158 has a central passage 162 through which the magnet enters with clearance each time a momentary, periodic energizing pulse is applied to input leads 164. The frequency of the energizing pulse is preferably selected at the resonant frequency of $$\frac{1}{2\pi} \sqrt{\frac{k}{I}},$$

where k equals the spring constant of leaf spring 134, and where I equals the moment of inertia of the magnet/reflector assembly suspended from the leaf spring. The assembly is oscillated about the axis 166. The spring is advantageously constituted of plastic or metal material.

In operation, each time the energizing pulse is applied to the coil 158, the magnet 156 is drawn into the passage 162, thereby pulling the reflector 152, the rear support 154, the V-block 148, the clamping pin 146, the set screw 150 therealong. At the same time, the leaf spring is bent. In the illustrated rest position, each arm of the leaf spring is generally planar. Upon being displaced, each arm of the leaf spring is bent, thereby storing energy therein. An L-shaped stop 168 mounted on the base support 140 is located behind the clamping pin 146 to prevent movement of the same past the stop. The pin 146 does not normally engage the stop; it is intended as a safety feature in the event that the arrangement is subjected to external shock forces.

Once bent, the leaf spring releases its stored energy, thereby displacing the magnet/reflector assembly back to and past the rest position. The entire assembly oscillates in a damped manner, until eventually coming to a halt in the rest position. Each arm of the leaf spring alternately assumes a concave and then a convex shape during such oscillation. Light directed from a source, e.g. a laser 170, onto the reflector 152 is swept in one direction in a scan across indicia to be read.

In still another variant, the holder means is a tuning fork which, as shown in FIG. 11, comprises a stem 172 and a pair of arms 174, 176. A permanent magnet 178 is fixedly mounted on arm 174. A scanner component, e.g. a light reflector 180, is fixedly mounted on arm 176. The stem 172 rests on, and extends through, a base support 182 of an L-shaped frame which has an upright support 184 on which an electromagnetic coil 186 is mounted. A fastener 188 secures the stem 172 in an upright orientation to the frame for joint movement therewith. Electrical input leads 190 supply energizing pulses to the coil 186.

As described so far, whenever an energizing pulse is supplied to coil 186, the coil draws the magnet 178 into a passage 192 with clearance. When the pulse ends, the tuning fork is caused to vibrate, preferably at the resonance frequency which, as described above, is a function of the moment of inertia of the vibrating mass. The reflector 180 oscillates between the scan end positions A and B. When light emitted from a source, e.g. laser 192, is directed at the reflector 180, a scan line ($A_1$-$B_1$) is formed which extends in one direction.

In an improved construction, the fork/frame assembly is mounted on an output shaft 194 of a motor 196 of the type described and claimed in U.S. Pat. No. 4,496,831, the contents of which are incorporated herein by reference. Motor 196 is a torque motor operative for displacing output shaft 194 in an amount proportional to the electrical current supplied thereto. Motor 196 repetitively oscillates the output shaft 194 in alternate directions as indicated by the double-headed arrow 198. The output shaft 194 is coupled to the fork stem 172 by a coupler 200.

As shown in FIG. 11, the opposite end of the output shaft 194 is restrained by a centering torsion spring 202. As the output shaft 194 is oscillated, the centering torsion spring 202 operates to return the output shaft 194 to the rest position. A scan line (C-D) is formed which extends in a direction perpendicular to said one direction.

It will be understood that each of the elements described above, or two or more together, also may find a useful application in other types of constructions differing from the types described above.

While the invention has been illustrated and described as embodied in a power-saving scanning arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a scanner for reading indicia having parts of different light reflectivity by directing light along a transmission path toward the indicia, and by collecting reflected light returning along a return path from the indicia, an arrangement for scanning the indicia, comprising:
   (a) a movable component mounted in at least one of said paths for guiding the light therein;
   (b) biasing means for exerting a biasing force to the component to constantly bias the component to a rest position; and
   (c) read-start means for moving the component away from the rest position against the biasing force to a launch position, and concomitantly storing energy in the biasing means, said read-start means including means for abruptly releasing the stored energy after the component is in the launch position to enable the biasing means to move the component back and forth and guide the light in said at lest one path over swing distances of progressively smaller amplitude until the component returns to, and halts in, the rest position, at least one of the swing distances extending over all parts of the indicia to read the same during the back-and-forth movement of the movable component.

2. The arrangement according to claim 1, wherein the biasing means includes an elongated spring extending along an axis and having opposite ends stationarily secured to a support, and wherein the component is mounted on the spring between the ends thereof.

3. The arrangement according to claim 2, wherein the spring is a torsion wire twistable about the axis.

4. The arrangement according to claim 2, wherein the launch position is angularly spaced from the rest position.

5. The arrangement according to claim 1, wherein the read-start means includes an actuator and a drive for pushing the component to said launch position, said drive being disengaged from and releasing the component after the component has reached said launch position.

6. The arrangement according to claim 5, wherein the biasing means includes an elongated spring extending along an axis, and wherein the component is fixedly mounted on the spring, and wherein the drive includes a cam fixedly mounted on the spring, and an actuator wire having one connected to the actuator, and an opposite drive end in force-transmitting engagement with the cam during pushing of the component toward said launch position.

7. The arrangement according to claim 6, wherein the cam is tapered radially outwardly of the axis and terminates in a tip, and wherein the drive end of the actuator wire is positioned past the tip and out of engagement with the cam after the component is situated at said launch position.

8. The arrangement according to claim 6, wherein the scanner includes a hand-held head, and wherein the actuator is a manually-operated trigger actuatable by a user from an off-state to an on-state; and further comprising automatic return means for constantly urging the trigger to the off-state.

9. The arrangement according to claim 6, wherein the drive is an electrically-operated drive energizable from an off-state to an on-state; and further comprising automatic return mass for constantly urging the drive to the off-state.

10. The arrangement according to claim 9, wherein the actuator is a generator of an energizing signal of limited time duration, and wherein the drive is a solenoid having a rotary core movable through a limited angular distance, said solenoid being energizable by the energizing signal of limited time duration.

11. The arrangement according to claim 1, and further comprising limit means for abutting the component at said launch position and for preventing movement of the component past said launch position.

12. The arrangement according to claim 1, wherein the read-start means includes an actuator for generating an energizing signal of limited time duration, and a drive including a solenoid coil and a reciprocatable core movable into and out of the coil when electrically energized by the energizing signal of limited time duration, and wherein the core is connected to the component.

13. The arrangement according to claim 1, wherein the component is a light reflector.

14. The arrangement according to claim 1 wherein the component is a laser light source.

15. The arrangement according to claim 1, wherein the biasing means includes an elongated spring having opposite ends stationarily secured to a support, and means for suspendably mounting the component on the spring between the ends thereof.

16. The arrangement according to claim 15, wherein the spring is a generally planar, bendable leaf spring.

17. The arrangement according to claim 16, wherein the spring is bent and stores energy during movement to said launch position.

18. The arrangement according to claim 17, wherein the read-start means includes an electrically-operated drive operative, when actuated, for moving the component to said launch position.

19. The arrangement according to claim 18, wherein the drive is an electromagnetic coil having a passage, and a magnet operatively connected to the component and movable into and out of the passage during actuation of the coil.

20. The arrangement according to claim 19, wherein the component is a light reflector, and wherein the suspendably mounting means includes means for clamping the spring to the reflector.

21. The arrangement according to clam 1, wherein the biasing means includes a vibratory tuning fork having a pair of arms on one of which is mounted the component, and wherein the read-start means includes an electrically-operated drive operative, when actuated, for vibrating the fork and oscillating the component.

22. The arrangement according to claim 21, wherein the drive includes an electromagnetic coil having a passage, and a magnet mounted on the fork and movable into and out of the passage during actuation of the coil.

23. The arrangement according to claim 22, wherein the component is a light reflector operative for directing light in a scan along a first scan direction; and further comprising means for displacing the reflector along a second scan direction generally perpendicular to said first scan direction to effect a two-axis scan pattern over the indicia.

24. A bar code scanner, comprising:
(a) a scan generator for directing light toward a bar code symbol to be read and for detecting light reflected from an area moving along a scan line across said symbol;
(b) a moving component included in said scan generator causing said area to move along said scan lines;
(c) biasing means for exerting a biasing force to said moving component to constantly bias the component to a rest position; and
(d) a read-start mechanism for moving the component away from said rest position against the biasing force to a launch position, and concomitantly storing energy in the biasing means, said mechanism including means for abruptly releasing the stored energy after the component is in the launch position to enable the biasing means to move the component back and forth over swing distances of progressively smaller amplitude until the component returns to, and halts in , said rest position, at least one of the swing distances extending across said symbol to read the same during the back-and-forth movement of the component.

25. A bar code scanner according to claim 24, wherein said biasing means is a torsion spring, and wherein said moving component is mounted don the torsion spring.

26. A bar code scanner according to claim 25, wherein said read-start mechanism includes a finger-operated trigger and a mechanical linkage from said trigger to said moving component.

27. A bar code scanner according to claim 24, wherein said component is a mirror, and wherein said generator includes a light source for directing the light toward the mirror for generating said scan line.

28. A bar code scanner according to claim 24, wherein said component is a mirror, and wherein said scan generator includes a light detector for receiving said reflected light by way of said mirror.

29. A bar code scanner according to claim 24, wherein said biasing means is a spring, and wherein said moving component is mounted on said spring, and wherein said read-start mechanism includes an electromechanical driver to deflect said component from said rest position.

30. A bar code scanner according to claim 29, wherein said spring is a flat spring member secured at its outer ends, and wherein said moving component is a mirror mounted at a central area of said spring between said outer ends.

31. A bar code scanner according to claim 30, wherein said electromechanical drive is actuated by a finger-operated trigger switch.

32. A bar code scanner according to claim 24, wherein said moving component is a mirror mounted between two spring members, the two spring members being secured at their outer ends to a hand-held housing.

33. A bar code scanner according to claim 32, wherein said spring members are torsion spring members, and wherein said mirror rotates about an axis of said torsion spring members.

* * * * *